United States Patent Office 2,849,451
Patented Aug. 26, 1958

2,849,451

PREPARATION OF s-TRIAZINES

Ingenuin Hechenbleikner, Clarksburg, Mass., and Grace Peters, Stamford, Conn., assignors to American Cyanamid Company, New York, N. Y., a corporation of Maine No Drawing. Application April 22, 1957
Serial No. 654,059

5 Claims. (Cl. 260—248)

The present invention relates to a new and improved process for preparing substituted s-triazines. More particularly, it relates to the fusion reaction of formamidine hydrohalide and a C-alkyl or C-aryl amidine hydrohalide to obtain the corresponding alkyl or aryl substituted s-triazine.

It is known that when fused, formamidine salts and other amidine salts will form unsubstituted or substituted s-triazines in unsatisfactory yields. For instance, as reported in Chemische Berichte, volume 87, page 1865 (1954), formamidine hydrochloride, when fused, forms unsubstituted s-triazine in yields amounting to about 9% of theory. As further disclosed in Berichte, when acetamidine hydrochloride is fused, trimethyl s-triazine is formed but in minute quantities detected only by its characteristic pungent odor. Such fusion process is disappointing, in view of the fact that substituted triazines are the subject of commercial interest as pesticides, and more particularly as fumigants and insecticides. Therefore, considerable effort has been expended in seeking an improved process whereby such substituted triazines can be obtained. A satisfactory process is still desired. It is, therefore, an object of the present invention to provide such a process.

This has been achieved in a simple and straight-forward manner. In the present invention, a mixture of formamidine hydrohalide and a C-alkyl or C-aryl amidine hydrohalide is fused at elevated temperatures. Surprisingly, the resultant reaction product can be obtained in satisfactory yield. The reaction product, which is principally obtained in the resultant vapor phase, is usually a mixture of mono- and di-substituted s-triazines. It may be collected and used per se or separated by known methods as by distillation under reduced pressure.

In general, according to this invention, the proportion of the reactants or the manner of admixing them can be varied. Thus, for instance, the reactants may be mixed in any order and the proportion of the reactants may be varied depending upon the predominant product desired. When equimolar quantities of formamidine hydrohalide and C-alkyl amidine or C-aryl amidine hydrohalide are reacted, the corresponding mono-substituted s-triazine will principally form. To obtain the di-substituted triazine, two mols of C-substituted amidine salt per mol of formamidine salt is a good practice. However, some slight excess of either reactant may and usually will be present. Nonetheless, such excess does not seem to affect the overall yield.

Although the fusion temperature will vary with the materials used, the reaction temperature may also vary considerably. Any temperature above that of incipient fusion may be used, usually in the range of from about 180° C. to about 275° C.

Quite practically, the fusion reaction described above may be carried out under atmospheric pressure. However, it has been found particularly advantageous to conduct the reaction under reduced pressure. The latter modification appears to cause yields of product to increase, and is therefore a preferred embodiment of this invention. Usually a reduced pressure in the range of from about 15 to about 150 mm. mercury pressure is sufficient. Under such conditions, the use of temperatures in the range of from 230° C. to 270° C. is a preferred practice. One or more of the reaction products may be removed and collected. By adjusting the temperature and pressure, resultant distillation may be controlled to favor the desired result.

The C-substituted amidine salts which may be employed herein can be characterized by the general structure:

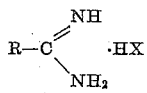

where R is methyl, ethyl and phenyl and X is halogen, such as chloride or bromide.

Typical amidine salts are: acetamidine hydrochloride, acetamidine hydrobromide, propionamidine hydrochloride, propionamidine hydroiodide, and benzamidine hydrochloride.

The process of the invention will be described more fully in the following illustrative examples using the hydrochloride as the representative salt of the respective amidine reactants. However, as noted above, it is within the purview of this invention that any salt, such as the bromide or iodide of the respective amidine reactants, is contemplated.

The following examples are illustrative of the method which may be used to form the substituted s-triazines of the present invention. These are not to be taken as limitative. Unless otherwise specified, the term "parts" refers to parts by weight.

EXAMPLE 1

To 40 parts (0.5 mol) of formamidine hydrochloride in a suitable reaction vessel equipped with stirrer and condenser are added 47 parts (0.5 mol) of acetamidine hydrochloride. The mixture while being stirred is heated to 250° C. under a reduced pressure of between 50 and 100 mm. mercury pressure. A fusion product, recovered as a distillate, is collected in a cooled receiver. This distillate which weighs 20.5 parts is a liquid at room temperature and contains primarily a mixture of monomethyl and dimethyl s-triazine as analyzed by mass spectroscopy.

To separate the components of the mixture, petroleum ether is added. A precipitate of 5 parts of crystals having a melting point of 48° C.–50° C., identified by analysis as dimethyl-s-triazine, is obtained. Calculated for $C_5H_7N_3$: 55.03% C; 6.42% H; 38.55% N. Found: 54.61% C; 6.55% H; 39.17% N.

EXAMPLE 2

This example shows the relative distribution of the various triazine derivatives recovered in Example 1, prior to recovery of dimethyl-s-triazine.

The distillate as obtained in the preceding example is redistilled through a 12 inch glass helex packed column at 50 mm. Hg pressure. The forerun fraction in the boiling range up to 45° C. is drawn off. It is solid at room temperature and weighs 2.5 parts. The next cut, designated as cut 1, between boiling range 45° C. and 50° C., weighs 5 parts and is liquid at 0° C. The second cut between boiling range 50° C. and 55° C., weighs 5 parts and is liquid at 0° C. The third cut, between 55° C. and 60° C., weighs 4 parts and is a solid at 25° C. The residue weighs 4 parts.

The percentage composition of cuts 1 and 2 was determined by mass spectroscopy. It can be tabularized as follows:

Table 1

| Fraction | Percent triazine | | | |
|---|---|---|---|---|
| | Unsubstituted | Monomethyl | Dimethyl | Trimethyl |
| Cut 1 | 26 | 48 | 24 | 2 |
| Cut 2 | 23 | 57 | 19 | 1 |

EXAMPLE 3

To a vessel suitably equipped for distillation, a mixture comprising 32 parts of formamidine hydrochloride and 44 parts of propionamidine hydrochloride is added, stirred and heated in a Woods' metal bath under a reduced pressure of from 20 to 40 mm. mercury pressure. Distillation took place at a bath temperature of from about 185° C. to 245° C. Resultant distillate is collected in a cooled receiver and is recovered as a liquid at room temperature. The product thus recovered is mainly a mixture of monoethyl and diethyl s-triazine as determined by mass spectroscopy.

EXAMPLE 4

The product recovered in the foregoing example is fractionated to show the relative distribution of the several triazine derivatives. This product is, however, combined with 3.2 parts of liquid product prepared from a small scale run made under identical conditions as those set forth in Example 3 above. The fractionation data is tabularized below wherein the triazine fractions are determined by mass spectroscopy.

Table 2

| Cut | B. P. (°C.) | mm. Hg | Parts[1] | $N_D^{25}$ | Percent triazines | | | |
|---|---|---|---|---|---|---|---|---|
| | | | | | Unsubst. | Ethyl | Diethyl | Triethyl |
| Forerun | 90–95 | 140 | 3.2 | 1.4830 | 34 | 58 | 8 | 0.2 |
| 1 | 70–75 | 50 | 3.0 | 1.4782 | <10 | 80 | 20 | 0.5 |
| 2 | 75–80 | 50 | 2.4 | 1.4774 | <6 | 79 | 20 | 0.3 |
| 3 | 80–85 | 50 | 2.5 | 1.4760 | <5 | 54 | 45 | 0.7 |
| 4 | 85–90 | 50 | 3.0 | 1.4740 | <3 | 17 | 81 | .2 |
| 5 | 90–92 | 50 | 3.0 | 1.4730 | <2.5 | 9 | 87 | 5 |
| 6 | 92–95 | 50 | 4.0 | 1.4733 | <3 | 7 | 79 | 14 |
| Residue | | | 1.8 | | <0.8 | 2 | 16 | 82 |
| | | | 22.9 | | [1]≈1.09 | [1]≈8.29 | [1]≈10.65 | [1]≈2.25 |

[1] Parts by weight.

Distillation of the residue above in a subsequent operation gave a crystalline product, solid at 0° C., and predominantly triethyl triazine. However, the total weight of the triazines obtained represents 60.5% of theory.

EXAMPLE 5

A mixture of 6.1 parts of formamidine hydrochloride and 6.1 parts of benzamidine hydrochloride is heated to 180° C. and fused in a vessel equipped with a reflux condenser. Heating is maintained at 180° C.–210° C. for 45 minutes at atmospheric pressure. Any volatiles are returned to the reaction during heating. The mixture is next steam distilled. The distillate is collected and recovered when cooled as a solid. The latter solid which weighs 0.3 part is identified as monophenyl s-triazine, having a melting point of from 60° C.–62° C.

The residue in the vessel is cooled and filtered. A black solid is obtained. 2.8 parts of dihpenyl s-triazine of melting point 82° C.–84° C. is obtained by extraction with methanol. A 67% yield of both mono and diphenyl s-triazines is obtained based on the conversion of benzamidine hydrochloride. The mixture is further identified by mass spectrography.

As previously stated, s-triazines obtained in accordance with the process of the present invention find utility as a pesticide. As illustrative, the compositions of Example 5 are tested in the following manner.

EXAMPLE 6

The mixture comprising monophenyl and diphenyl s-triazine prepared in accordance with the procedure of Example 5 is applied as a 0.1% spray (in 65% acetone and 35% water) to nastrium aphids. A kill of 80% is observed.

When using diphenyl s-triazine alone as a 0.1% spray in the same manner as above, a kill of 84% is observed.

We claim:

1. An improved method for preparing substituted s-triazines which comprises: heating at temperatures between 180° C. and 275° C. to fuse at least equimolecular quantities of formamidine hydrohalide and an amidine compound represented by the formula:

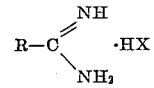

where R is selected from the group consisting of methyl, ethyl and phenyl and X is a halogen atom, and recovering thus-formed substituted s-triazines.

2. A method according to claim 1 in which the fusion reaction is carried out under reduced pressure of from about 15–150 mm. mercury pressure.

3. An improved method for preparing substituted s-triazines which comprises: fusing formamidine hydrochloride with acetamidine hydrochloride in at least equimolecular quantities at a temperature of from about 180° C.–275° C. under a reduced pressure of from about 15 to 150 mm. mercury, and recovering resultant substituted s-triazines.

4. An improved method for preparing substituted s-triazines which comprises: fusing formamidine hydrochloride and propionamide hydrochloride in at least equimolecular quantities at a temperature of between about 180° C. and 275° C. under reduced pressures of from 15 to 150 mm. mercury, and recovering resultant substituted s-triazines.

5. An improved method for preparing substituted s-triazines which comprises: fusing formamidine hydrochloride with benzamidine hydrochloride in at least equimolecular quantities at a temperature of between about 180° C. and 275° C. under reduced pressure of from 15 to 150 mm. mercury and recovering resultant substituted s-triazines.

References Cited in the file of this patent

UNITED STATES PATENTS 2,598,811    Mahan et al. _____ June 3, 1952

OTHER REFERENCES

Shriner et al.: Chemical Reviews, vol 35, Number 3, page 388 (1944).

Grundman et al.: Journal of the American Chemical Society, vol. 76, pp. 5646–5650 (1954).

Grundman et al.: Chemische Berichte, vol. 87, pp. 1865–1868 (1954).